(12) United States Patent
Sato (10) Patent No.: US 12,076,646 B2
(45) Date of Patent: Sep. 3, 2024

(54) INFORMATION PROCESSING DEVICE AND IMAGE DISPLAY METHOD (71) Applicant: SONY INTERACTIVE ENTERTAINMENT INC., Tokyo (JP)

(72) Inventor: Kei Sato, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 258 days.

(21) Appl. No.: 17/610,259

(22) PCT Filed: May 29, 2020

(86) PCT No.: PCT/JP2020/021314
§ 371 (c)(1),
(2) Date: Nov. 10, 2021

(87) PCT Pub. No.: WO2020/246379
PCT Pub. Date: Dec. 10, 2020

(65) Prior Publication Data
US 2022/0241694 A1    Aug. 4, 2022

(30) Foreign Application Priority Data
Jun. 6, 2019 (JP) .................. 2019-106244

(51) Int. Cl.
*A63F 13/795* (2014.01)
*A63F 13/533* (2014.01)
*A63F 13/87* (2014.01)
(52) U.S. Cl.
CPC .......... *A63F 13/795* (2014.09); *A63F 13/533* (2014.09); *A63F 13/87* (2014.09)

(58) Field of Classification Search
CPC ...... A63F 13/795; A63F 13/533; A63F 13/87; A63F 13/35; A63F 13/5375; A63F 13/837; G06F 3/04842; G06F 3/0219; G06F 3/0338; G06F 3/03547; G06F 3/0482; G06F 3/0481
See application file for complete search history.

(56) References Cited

U.S. PATENT DOCUMENTS

| 7,828,661 | B1 | 11/2010 | Fish et al. |
| 8,663,011 | B2 | 3/2014 | Kirmse et al. |
| 2009/0210301 | A1 | 8/2009 | Porter et al. |
| 2012/0131086 | A1 | 5/2012 | Hoffman et al. |

(Continued)

FOREIGN PATENT DOCUMENTS

| EP | 3101614 A1 | 12/2016 |
| JP | 2014-079528 A | 5/2014 |

(Continued)

OTHER PUBLICATIONS

US 10,434,408, 10/2007, Hansen et al. (withdrawn)*
(Continued)

*Primary Examiner* — Ronald Laneau
(74) *Attorney, Agent, or Firm* — XSENSUS LLP (57) ABSTRACT

A content image display section 112 displays a content image. A system image display section 130 overlaps a system image on the content image, according to a user operation, and displays the overlapped image. A button display section 144 displays a session button for inviting a specific user to a game session.

20 Claims, 10 Drawing Sheets

(56) References Cited

U.S. PATENT DOCUMENTS

| | | | |
|---|---|---|---|
| 2012/0178536 | A1 | 7/2012 | Oh et al. |
| 2017/0209790 | A1 | 7/2017 | Nomura |
| 2017/0216721 | A1* | 8/2017 | Nomura .................. A63F 13/24 |
| 2017/0291111 | A1 | 10/2017 | Chandrasekaran et al. |
| 2022/0326815 | A1* | 10/2022 | Suzuki et al. ......... G06F 3/0484 |
| 2023/0277928 | A1* | 9/2023 | Yonetomi et al. ...... A63F 13/52 |

FOREIGN PATENT DOCUMENTS

| | | |
|---|---|---|
| JP | 2016-042238 A | 3/2016 |
| JP | 2016042338 A | 3/2016 |
| JP | 2017-046992 A | 3/2017 |
| TW | 201903476 A | 1/2019 |

OTHER PUBLICATIONS

The extended European search report dated Jun. 6, 2023, from European Patent Application No. 20819485.2, 10 sheets.

Advent Games : "UE4 Tutorial I Steam Friends I Inviting and Accepting Requests", May 14, 2019 (May 14, 2019), XP093048995, Retrieved from the Internet:URL:https://www.youtube.com/watch?v=jkzG-7_d_3w, 1 sheet plus 1 sheet of English translation.

Arekkz Gaming:"Xbox One Tutorial-Parties and Game Invites Tutorial", Nov. 24, 2013 (Nov. 24, 2013), XP093049001 Retrieved from the Internet: URL:https://www.youtube.com/watch?v=E0ut5ONW1ls, [retrieved on May 23, 2023], 1 sheet plus 1 sheet of English translation.

Notice of Reasons for Refusal dated May 9, 2023, from Japanese Patent Application No. 2019-106244, 3 sheets.

International Search Report and Written Opinion mailed Aug. 4, 2020, from PCT/JP2020/021314, 2 sheets.

デッドライジング2 オフィシャルコンプリートガイド,Oct. 30, 2010, ISBN978-4-86233-281-3, p. 025, p. 025, upper column, (Dead Rising 2 Official Complete Guide, first edition, Copcom Co., Ltd.), 4 sheets.

Preliminary Examination dated May 5, 2023, from Taiwanese Patent Application No. 109115683, 8 sheets.

Chaython, "How to invite your friend for Co-Op", [online ]Sep. 9, 2014, URL:http://steamcommunity.com/sharedfiles/fileddetails/?id=311948492 (Japanese version of NPL3) (2 pgs).

"Dead Rising 3—How to Invite Friend to Co-Op Game / Join Friend's Game", (Nov. 23, 2013), <https://www.youtube.com/watch?v=L0qmPY834Y4> (6 pgs).

"How to invite your friend for Co-Op", (Sep. 9, 2014), <https://steamcommunity.com/sharedfiles/filedetails/?id=311948492>(English version of NPL1) (4 pgs).

* cited by examiner

INFORMATION PROCESSING DEVICE AND IMAGE DISPLAY METHOD

TECHNICAL FIELD

The present disclosure relates to a technique that overlaps a system image generated by system software on a content image and that displays the overlapped image.

BACKGROUND ART

PTL 1 discloses a game device by which a user operates an input device to change a display screen from a game screen to a home screen, further operates the input device to change the display screen from the home screen to a function screen, and then selects a chat icon on the function screen, so that an entry screen to a chat room is displayed.

CITATION LIST

Patent Literature

[PTL 1]
JP 2016-042238A

SUMMARY

Technical Problem

In recent years, there have been increasing opportunities for establishing communication with a friend through the Internet, for example, playing a game with a friend who is in a remote place or having a chat with the friend. Accordingly, simplification of a procedure for establishing communication with a friend has been demanded.

Solution to Problem

In order to solve the above problem, an information processing device according to an aspect of the present disclosure includes a content image display section that displays a content image and a system image display section that overlaps a system image on the content image, according to a user operation, and displays the overlapped image. The system image display section includes a button display section that displays a function button for executing a function of inviting a specific user. The button display section displays a session button for inviting the specific user to a game session.

An image display method according to another aspect of the present disclosure is a method of overlapping a different image on a content image and displaying the overlapped image, the method includes a step of displaying the content image, a step of overlapping a first window including pieces of information regarding a plurality of users on the content image and displaying the overlapped image, and a step of overlapping a piece of information regarding one of the users included in the first window and a second window including a session button for inviting the user to a game session on the content image and displaying the overlapped image.

Note that any combinations of the above components and expressions of the present disclosure as converted into methods, devices, systems, and computer programs are also effective as aspects of the present disclosure.

DESCRIPTION OF EMBODIMENT

Figure 1:
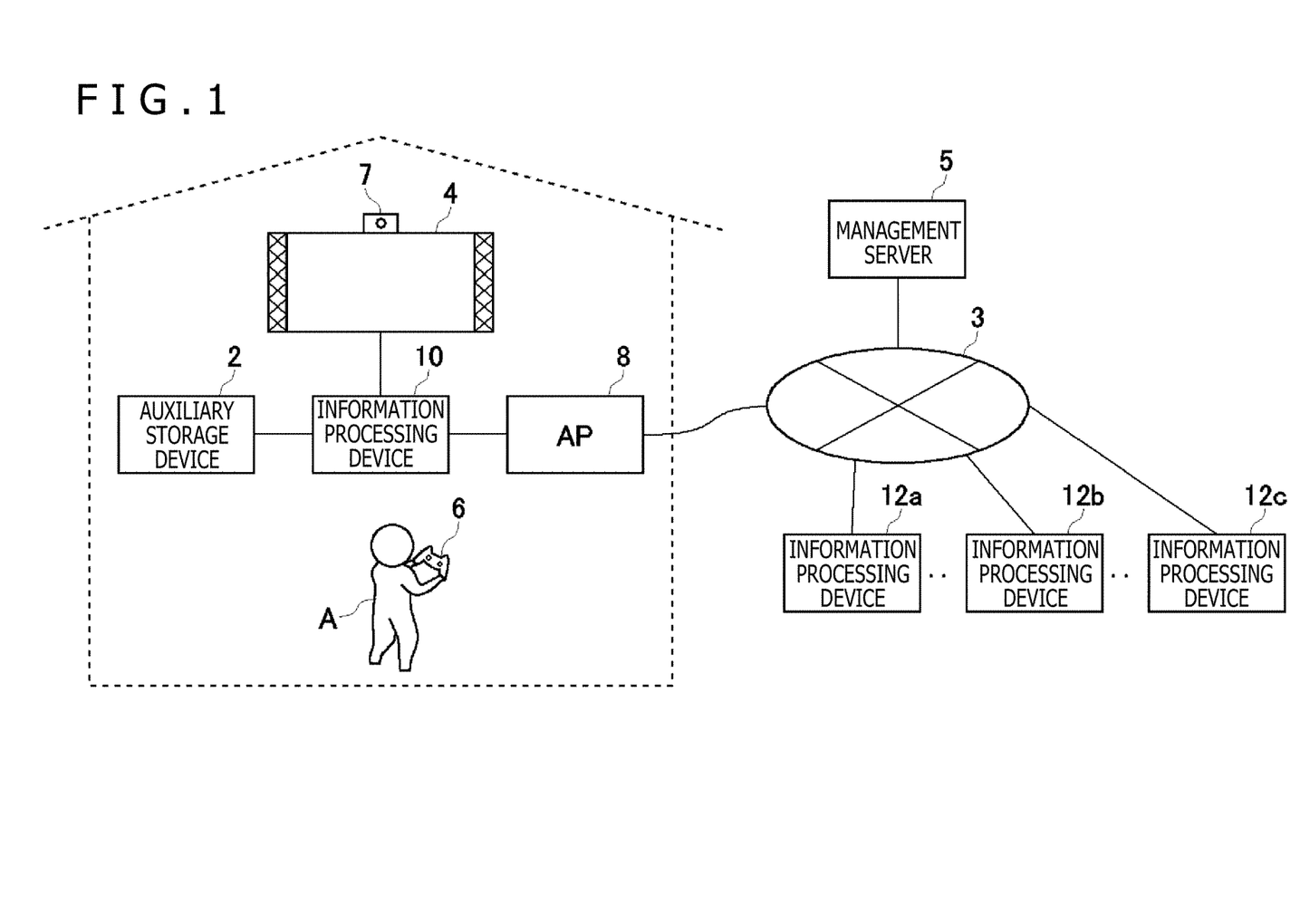
FIG. 1 is a diagram illustrating an information processing system according to an embodiment.

FIG. 1 is an information processing system 1 according to an embodiment. The information processing system 1 includes an information processing device 10 used by a user A, information processing devices 12a to 12c used by other users (hereinafter, they are called an "information processing device 12" unless particularly distinguished from one another), and a management server 5. The information processing device 10 and the information processing device 12 may be terminal devices provided with the same structure and functions. An access point (hereinafter, called an "AP") 8 has a function of a router and a wireless access point, and the information processing device 10 connects to the AP 8 in a wireless or wired manner to connect to the management server 5 on a network 3 through the AP 8 in such a manner as to be able to communicate with the management server 5. The information processing device 10 and the information processing device 12 are connected to each other through the management server 5, so that users can play a game together or have a chat with each other.

An auxiliary storage device 2 is a large-capacity storage device such as an HDD (Hard Disk Drive) and an SSD (Solid State Drive) and may be a built-in storage device or may be an external storage device that connects to the information processing device 10 through a USB (Universal Serial Bus) or the like. An output device 4 may be a television having a display that outputs an image and a speaker that outputs sound or may be a head-mounted display. The output device 4 may be connected to the information processing device 10 through a cable or may be connected in a wireless manner. A camera 7 also functioning as an imaging device is provided in the vicinity of the output device 4 to image a space around the output device 4. The camera 7 may be a stereo camera.

The information processing device 10 is connected to an input device 6 operated by the user, in a wired or wireless manner, and the input device 6 outputs operation information of the user to the information processing device 10. When receiving the operation information from the input device 6, the information processing device 10 reflects the operation information on processing of system software or application and then outputs a result of the processing from the output device 4. In the embodiment, the information processing device 10 is a game device that executes a game program or other applications, and the input device 6 may be a game controller that provides operation information of a user to the game device.

The management server 5 provides a network service to a user of the information processing system 1. The management server 5 manages a network account that identifies each user, and each user uses his/her network account to sign in to the network service provided by the management server 5. The management server 5 provides an environment that allows users who have signed in to the relevant network service to play with one another or to establish communication with one another through use of a voice chat and a video chat.

Figure 2:
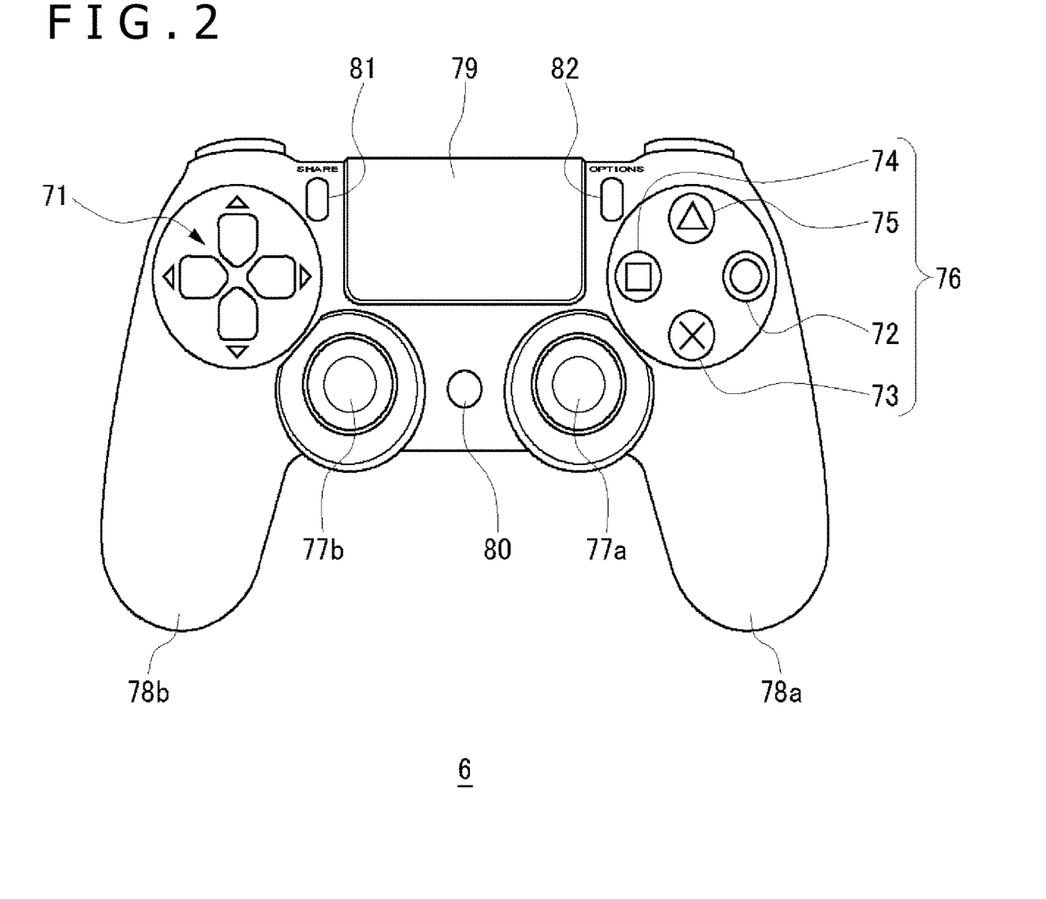
FIG. 2 is a diagram illustrating an external configuration of an upper surface of an input device.

A button configuration of the input device 6 will now be described.

FIG. 2 illustrates an external configuration of an upper surface of the input device. A user holds a left-side gripping portion 78b with his/her left hand and holds a right-side gripping portion 78a with his/her right hand to operate the input device 6. The upper surface of a casing of the input device 6 is provided with direction keys 71, analog sticks 77a and 77b, and four kinds of operation buttons 76. Four kinds of buttons 72 to 75 have different figures marked in different colors thereon in order to allow distinction from one another. In particular, the circle button 72 is marked with a red round mark, the cross button 73 with a blue cross mark, the square button 74 with a purple square mark, and the triangular button 75 with a green triangle mark.

A function button 80 is provided between the two analog sticks 77a and 77b. The function button 80 is used to turn on power supply to the input device 6 and to simultaneously make active a communication function of connecting the input device 6 and the information processing device 10 to each other. After the input device 6 is connected to the information processing device 10, the function button 80 is used also to cause the information processing device 10 to overlap a system image generated by the system software on a content image such as a game image and display the overlapped image.

A touch pad 79 is provided in a flat region between the direction key 71 and the operation buttons 76. The touch pad 79 functions also as a depression type button which sinks downward when the user presses it and returns to its original position when the user takes his/her hand off it. A SHARE button 81 is provided between the touch pad 79 and the direction key 71. The SHARE button 81 is used to input an instruction from the user for the system software in the information processing device 10. An OPTIONS button 82 is provided between the touch pad 79 and the operation buttons 76. The OPTIONS button 82 is used to input an instruction from the user for application (game) software executed by the information processing device 10.

Figure 3:
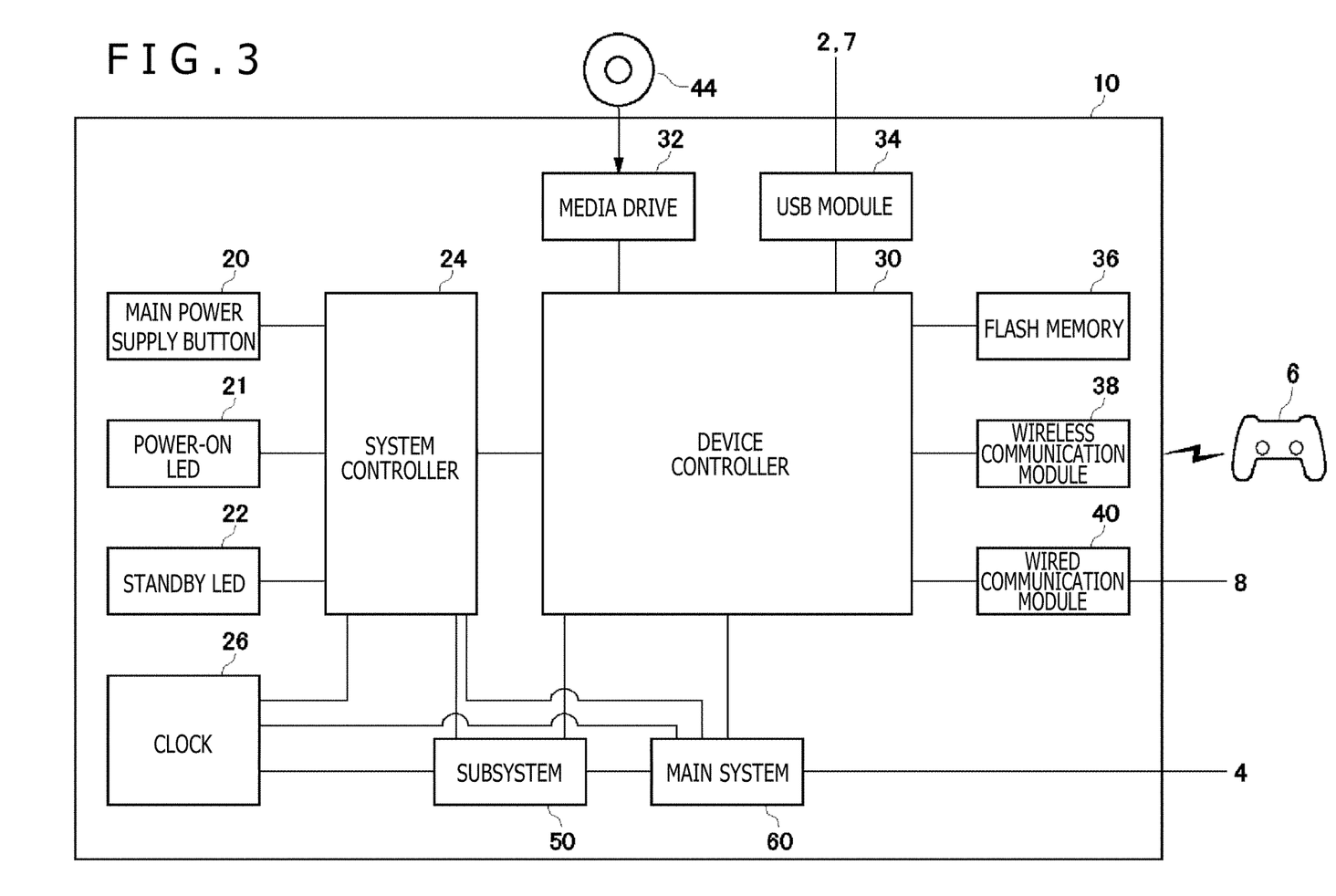
FIG. 3 is a diagram illustrating a hardware configuration of an information processing device.

FIG. 3 illustrates a hardware configuration of the information processing device 10. The information processing device 10 includes a main power supply button 20, a power-ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory serving as a main storage device, a memory controller, a GPU (Graphics Processing Unit), and the like. The GPU is used mainly for computing processing of a game program. These functions may be configured as a system-on-chip and formed on one chip. The main CPU has a function of executing a game program recorded in the auxiliary storage device 2.

The sub system 50 includes a sub CPU, a memory serving as a main storage device, a memory controller, and the like, but neither includes a GPU nor has a function of executing a game program. The number of circuit gates of the sub CPU is smaller than the number of circuit gates of the main CPU, and the operation power consumption of the sub CPU is lower than the operation power consumption of the main CPU. The sub CPU operates also while the main CPU is in a standby state and is limited in processing function thereof such that the power consumption is kept low.

The main power supply button 20 is an input unit through which operation input is performed by a user and is provided on a front face of the casing of the information processing device 10. The main power supply button 20 is operated in order to turn on or off power supply to the main system 60 of the information processing device 10. The power-ON LED 21 is lit when the main power supply button 20 is turned on, and the standby LED 22 is lit when the main power supply button 20 is turned off.

The system controller 24 detects depression of the main power supply button 20 performed by a user. If the main power supply button 20 is depressed when the main power supply is in an off state, the system controller 24 accepts the depression operation as a "turn on instruction," but if the main power supply button 20 is depressed when the main power supply is in an on state, the system controller 24 accepts the depression operation as a "turn off instruction."

The clock 26 is a real time clock, generates current date and time information, and supplies the generated information to the system controller 24, the sub system 50, and the main system 60. The device controller 30 is configured as an LSI (Large-Scale Integrated Circuit) which executes delivery of information between devices like a south bridge. As depicted in the figure, such devices as the system controller 24, the media drive 32, the USB module 34, the flash memory 36, the wireless communication module 38, the wired communication module 40, the sub system 50, and the main system 60 are connected to the device controller 30. The device controller 30 accommodates a difference in electric characteristic or a difference in data transfer rate between the devices and controls the timing of data transfer.

The media drive 32 is a drive device which is loaded with and drives the ROM (Read Only Memory) medium 44 on which software such as a game and license information are recorded, and reads a program, data, and the like from the ROM medium 44. The ROM medium 44 is a read-only recording medium such as an optical disc, a magneto-optical disc, or a Blu-ray disc.

The USB module 34 is a module connected to external equipment by a USB cable. The USB module 34 may be connected to the auxiliary storage device 2 and the camera 7 by a USB cable. The flash memory 36 is an auxiliary storage device forming an internal storage. The wireless communication module 38 performs wireless communication, for example, with the input device 6 under a communication protocol such as a Bluetooth (registered trademark) protocol or an IEEE (Institute of Electrical and Electronics Engineers) 802.11 protocol. Incidentally, the wireless communication module 38 may support a digital mobile telephone system. The wired communication module 40 performs wired communication with external equipment. The wired communication module 40 is connected to the network 3 outside, for example, through the AP 8.

Figure 4:
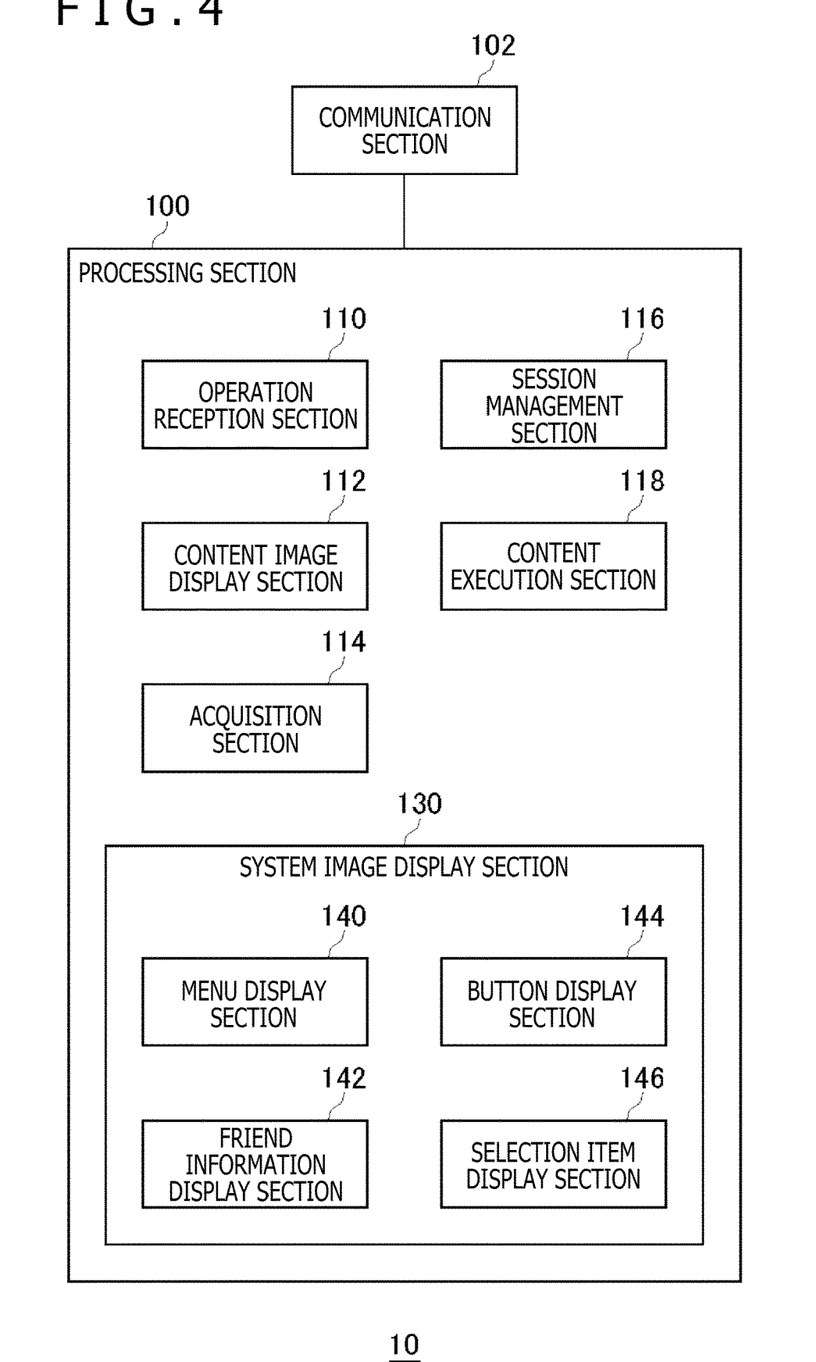
FIG. 4 is a diagram illustrating functional blocks of the information processing device.

FIG. 4 illustrates functional blocks of the information processing device. The information processing device 10 includes a processing section 100 and a communication section 102. The processing section 100 includes an operation reception section 110, a content image display section 112, an acquisition section 114, a session management section 116, a content execution section 118, and a system image display section 130. The system image display section 130 is implemented by the system software, includes a menu display section 140, a friend information display section 142, a button display section 144, and a selection item display section 146, and generates a system image. The system image display section 130 overlaps a system image on a content image, according to a user operation, and displays the overlapped image.

In FIG. 4, elements indicated as functional blocks for performing various types of processing can be configured by hardware such as a circuit block, a memory, or another LSI or implemented by software such as system software or a game program loaded into the memory. Thus, it will be understood by those skilled in the art that these functional blocks may variously be implemented by hardware only, by software only, or by a combination of hardware and software. The functional blocks are not limited to any of these.

The communication section 102 receives operation information regarding operation performed by the user with a button or the like of the input device 6, while receiving, from the management server 5, information indicating a current status of a friend of the user A, data related to a chat, and the like. The communication section 102 is represented as a configuration that has functions of both the wireless communication module 38 and the wired communication module 40 which are illustrated in FIG. 3.

The operation reception section 110 receives operation information of the input device 6 through the communication section 102. In the embodiment, the content execution section 118 executes a game program and generates image data and sound data of the game. A function to be provided as the content execution section 118 is implemented by system software, a game program, or hardware such as a GPU. It is to be noted that a game is an example of an application, and the content execution section 118 may execute an application other than a game.

During a game play by the user A, the operation reception section 110 supplies operation information of the input device 6 to the content execution section 118, while the content execution section 118 executes computing processing that moves a player character in a virtual space, on the basis of the operation information. The content execution section 118 includes a GPU that executes rendering processing, and generates, upon receipt of a result of computing processing in the virtual space, game image data and game sound data from a viewpoint position (virtual camera) in the virtual space. The content image display section 112 displays a game image from the output device 4, and the sound providing section (not illustrated) outputs a game sound from the output device 4.

Figure 5:
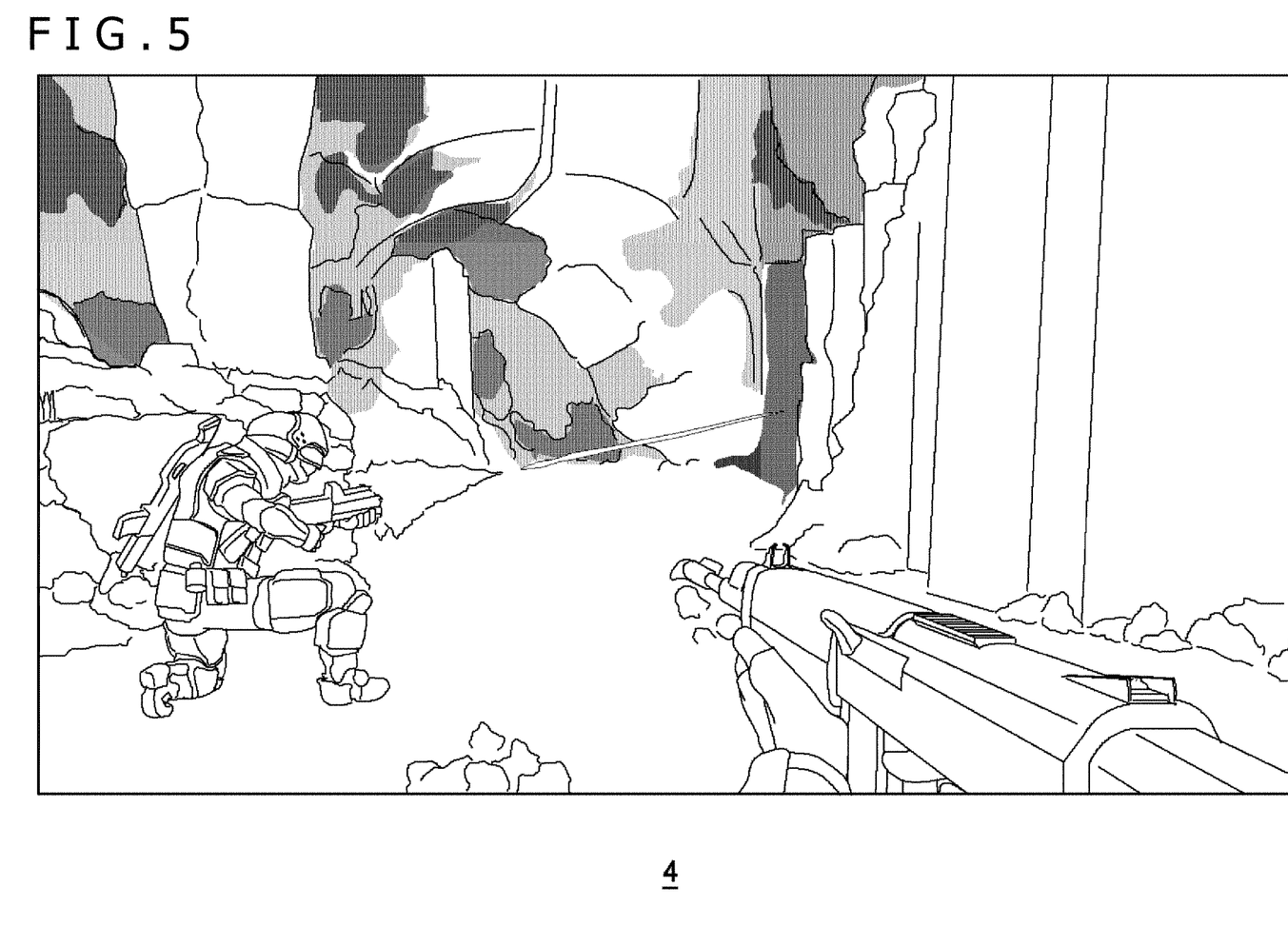
FIG. 5 is a diagram illustrating an example of a game screen.

FIG. 5 illustrates an example of the game screen in which the user A is playing. The user A plays the game by operating the input device 6, while viewing and listening to the game image and the game sound output from the output device 4.

The information processing device 10 of the embodiment provides a scheme that allows the user A who is playing a game to invite a friend to his/her game session in a simple procedure. During the game play, when the user A short-presses the function button 80 of the input device 6, the operation reception section 110 receives the short-pressing operation of the function button 80.

Figure 6:
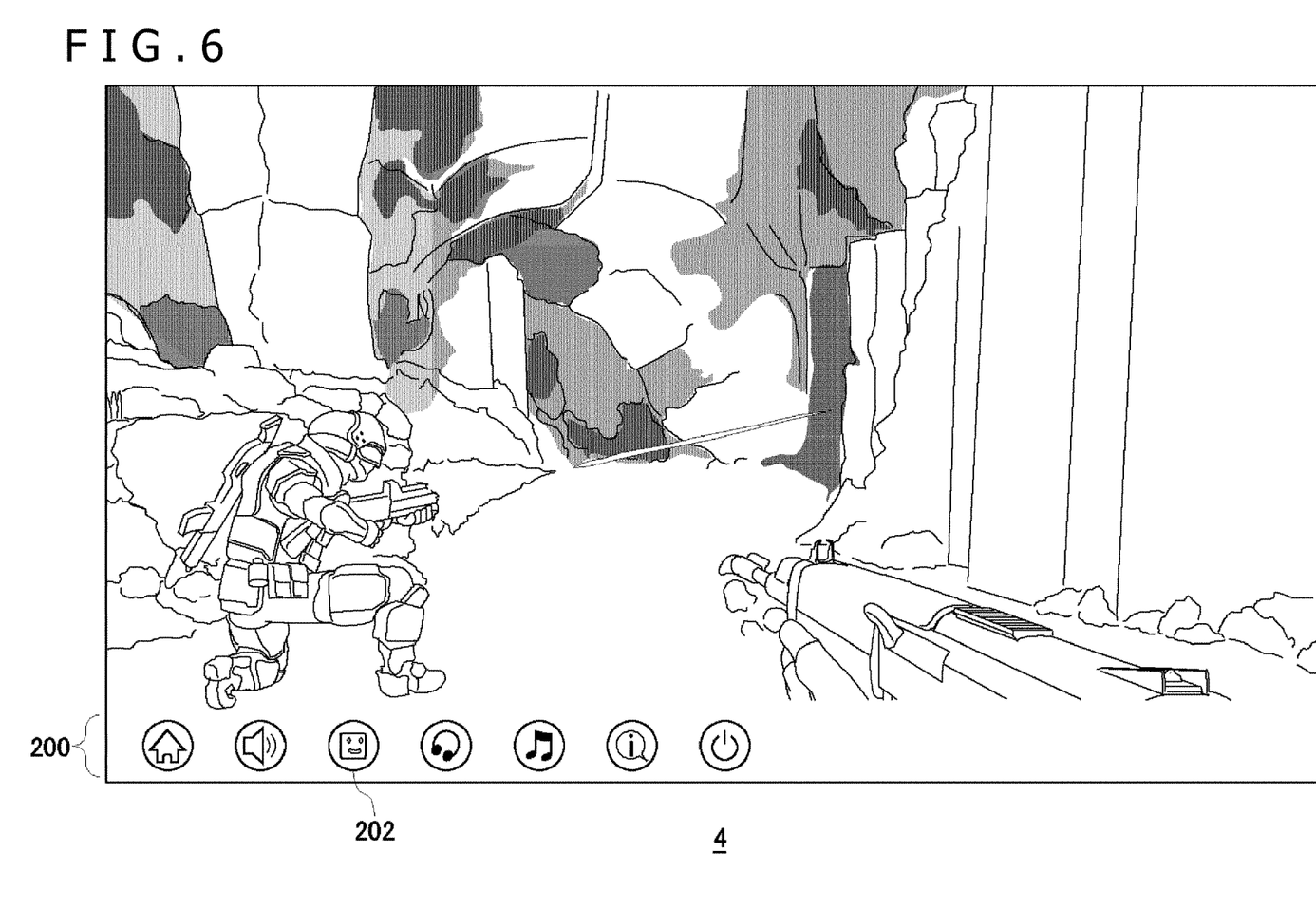
FIG. 6 is a diagram illustrating an example in which a system image is overlapped on a game image and displayed.

The operation reception section 110 supplies information regarding the short-pressing operation of the function button 80 received while the game is being executed to the system image display section 130. In the system image display section 130, the menu display section 140 overlaps a system image including a plurality of menu items on the game image and displays the overlapped image. When the system image is displayed in such a manner as to be overlapped on the game image, the operation reception section 110 starts supplying, to the system software, operation information which is to be subsequently received.

FIG. 6 illustrates an example in which the system image including a menu icon is overlapped on the game image and displayed. The menu display section 140 sets a function icon selection region 200 on a lower portion of the display screen and arranges and places a plurality of menu icons in a line. The user A selects the menu icon, so that the user A can execute a system function associated with the selected icon. Here, the user A selects a friend icon 202.

Figure 7:
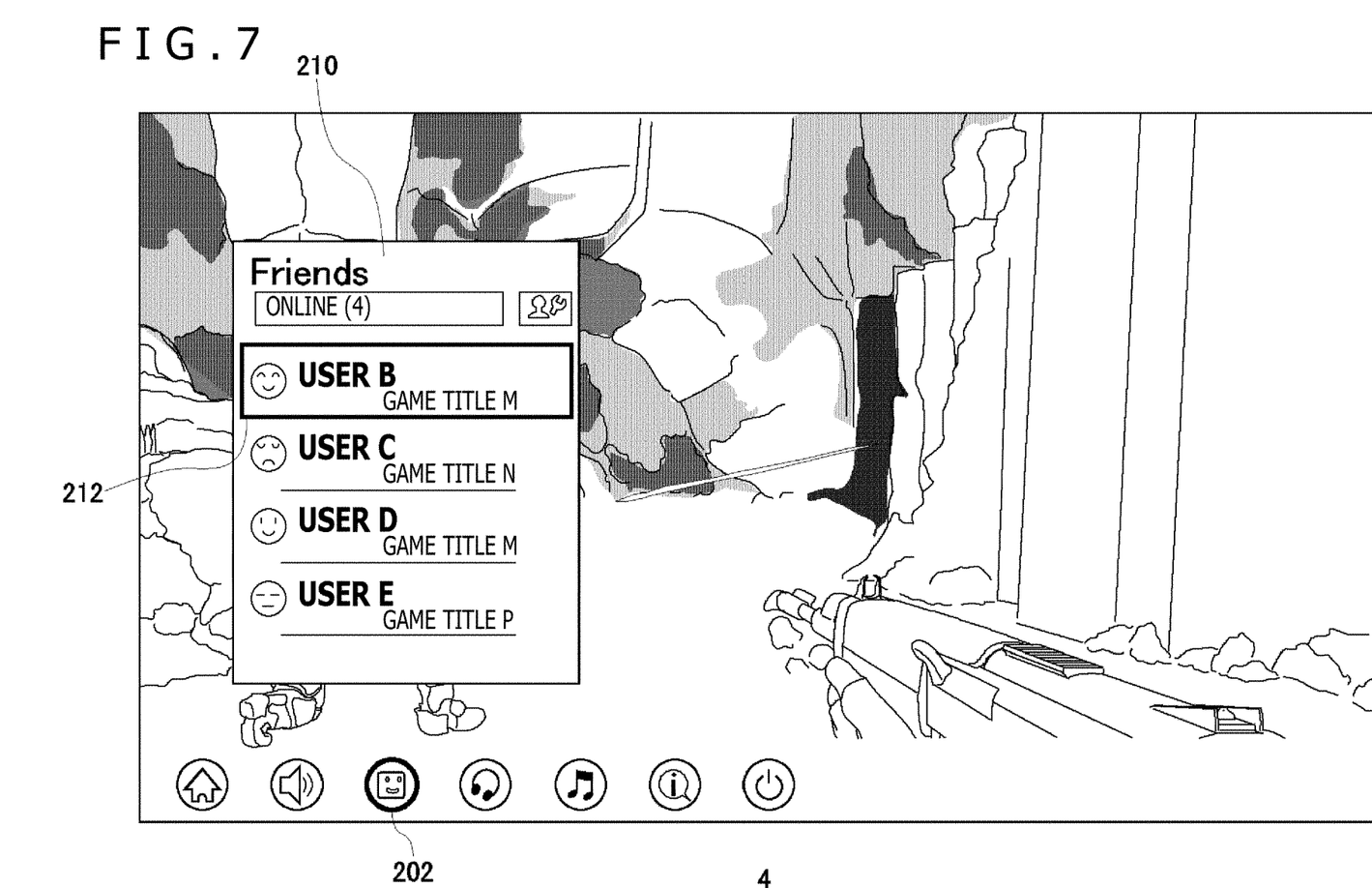
FIG. 7 is a diagram illustrating an example of a friend window.

When the operation reception section 110 receives the operation information regarding the selection of the friend icon 202, the friend information display section 142 overlaps the system image including information related to a friend of the user A on the game image and displays the overlapped image.

FIG. 7 illustrates an example of a friend window 210. The friend information display section 142 overlaps the friend window 210 including user names of users B, C, D, and E online and respective game titles which are being played by the users B, C, D, and E, on the game image, and displays the overlapped image. Information regarding a friend is obtained from the management server 5 by the acquisition section 114. The acquisition section 114 may acquire the information regarding a friend from the management server 5 periodically or may acquire the information regarding a friend from the management server 5 when a status of the friend has changed in the management server 5. It is preferred that the information regarding a friend of the user A be maintained to be latest in the information processing device 10. The user A can check the friend who is online by viewing the friend window 210 and also can check the game title being played by the friend online.

The friend window 210 includes a selection frame 212, and the user A selects one of the friends by moving the selection frame 212. When the user A aligns the selection frame 212 with the user B and operates an enter button of the input device 6, the operation reception section 110 receives operation information, and the friend information display section 142 displays a detailed window including detailed information of the user B on the right side of the friend window 210.

Figure 8:
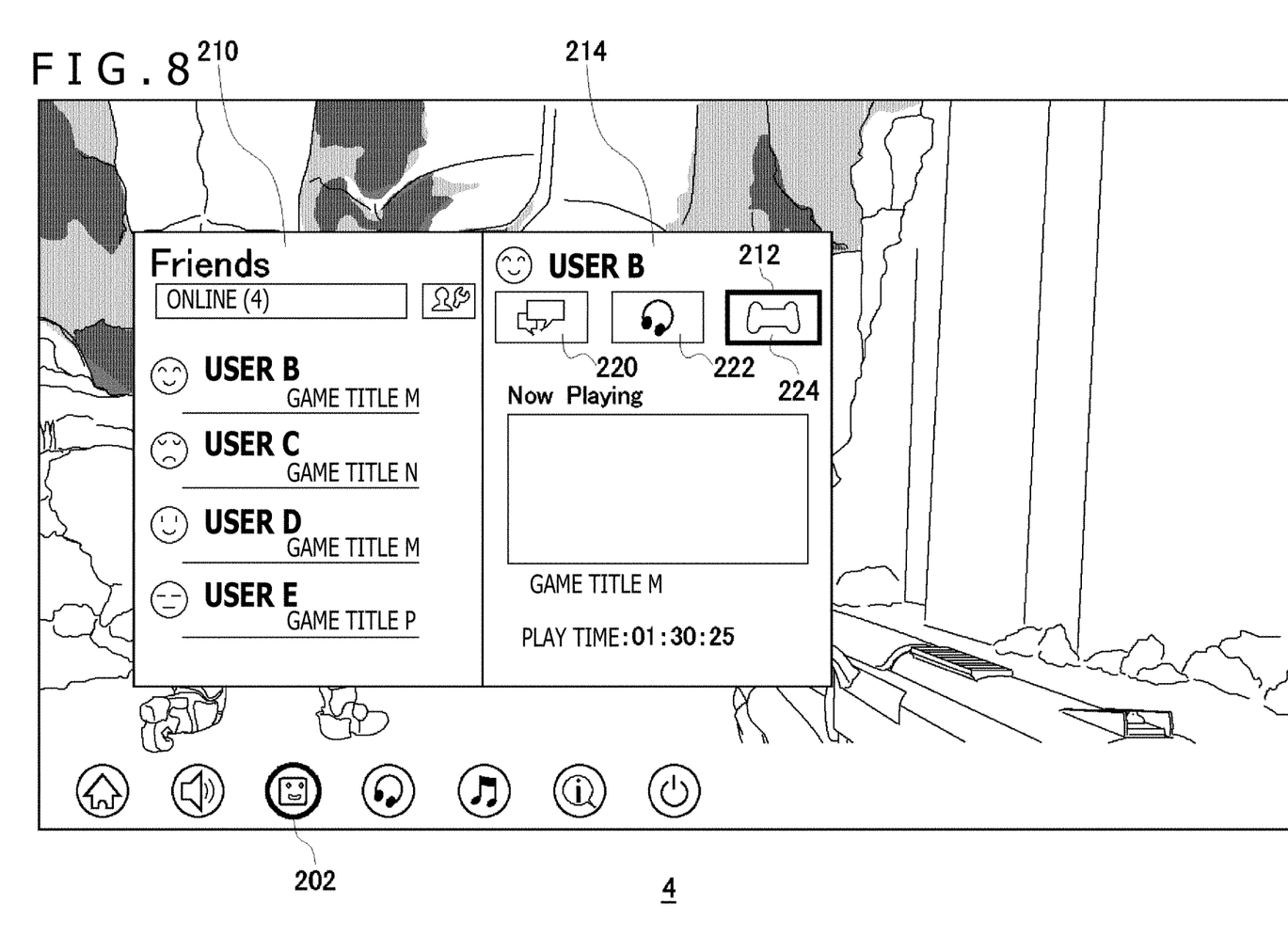
FIG. 8 is a diagram illustrating an example of a detailed window of a friend.

FIG. 8 illustrates an example of a detailed window 214 of a friend. The friend information display section 142 overlaps the detailed window 214 including the detailed information of the user B that has been selected, on the game image, and displays the overlapped image. In this example, the acquisition section 114 acquires a moving image of a game play performed by the user B, through the management server 5, and then reproduces the moving image in the detailed window 214. In the detailed window 214, a play time may be displayed, for example, or information regarding a chat group in which the user B takes part may be displayed.

In the detailed window 214, the button display section 144 displays a function button for executing a function of inviting a specific user. The specific user is the user B selected in the friend window 210. In the example illustrated in FIG. 8, the button display section 144 arranges and displays a text chat button 220 for inviting the user B to a text chat, a voice chat button 222 for inviting the user B to a voice chat, and a session button 224 for inviting the user B to a game session, in a line, in the detailed window 214.

The detailed window 214 is a region in which detailed information of one friend is displayed, and by placing the text chat button 220, the voice chat button 222, and the session button 224 in the detailed window 214, the user A can invite a specific friend to a chat or a game session with ease.

Procedures performed when the user B is invited to a game session will be summarized below.

(Procedure 1) The user A short-presses the function button 80 during the game play, and causes the function icon to be displayed on the lower portion of the display screen.

(Procedure 2) The user A selects and operates the friend icon 202, and causes the friend window 210 to be overlapped on the game image and the overlapped image to be displayed.

(Procedure 3) The user A selects the user B in the friend window 210, and causes the detailed window 214 to be overlapped on the game image and the overlapped image to be displayed.

(Procedure 4) The user A presses the session button 224 in the detailed window 214.

In this manner, the user A can invite the user B to the game session in easy procedures. It is to be noted that, in a case in which the user B is invited not to a game session, but to a text chat or a voice chat, the user A may press the text chat button 220 or the voice chat button 222 in the procedure 4.

As illustrated in FIG. 8, the button display section 144 displays the text chat button 220, the voice chat button 222, and the session button 224 on the same screen as the screen on which the information regarding a specific user is displayed, so that the user A recognizes a playing partner for sure and further can invite the playing partner to a certain function such as a chat or a game session.

Figure 9:
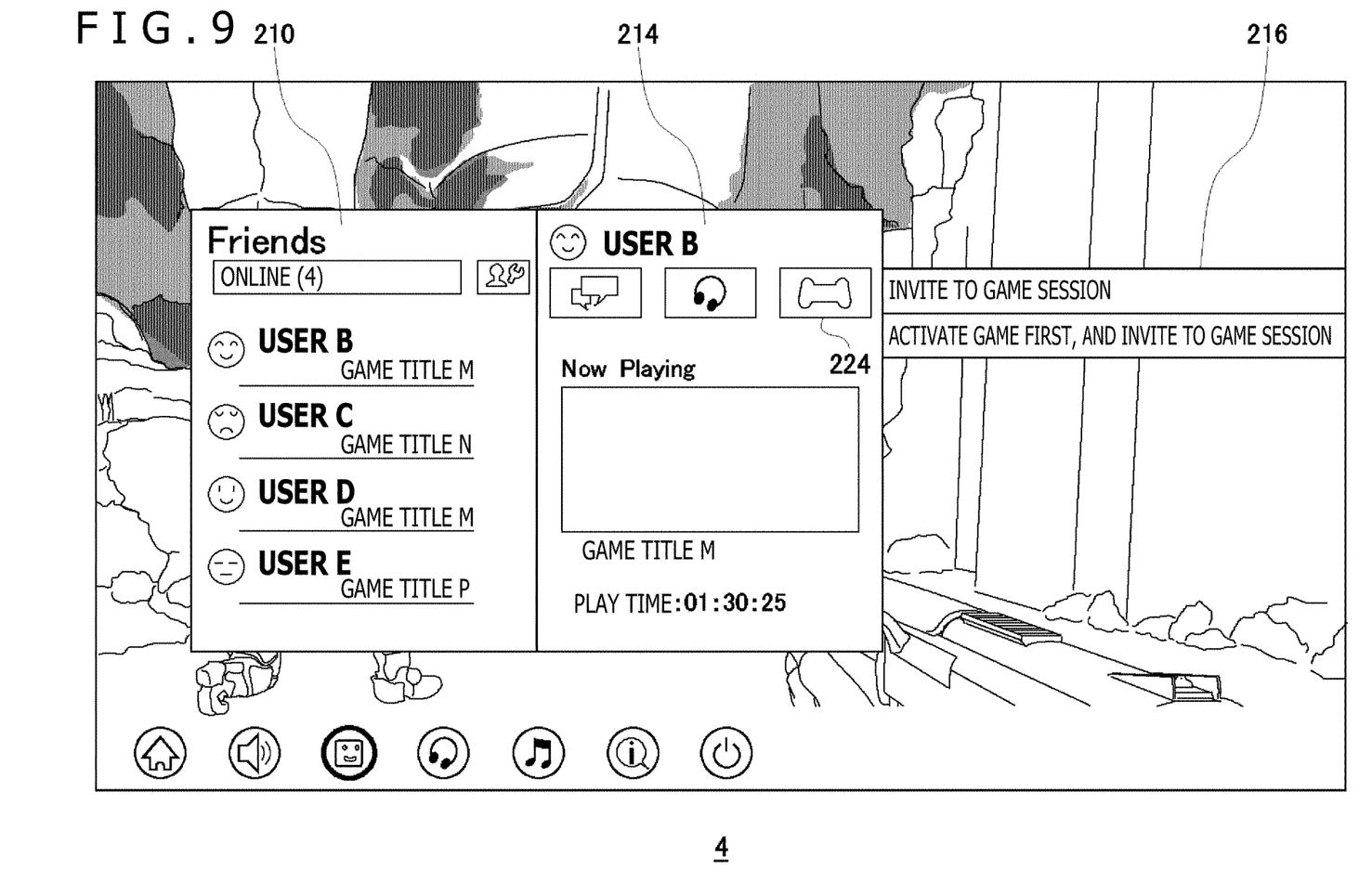
FIG. 9 is a diagram illustrating an example of an item field.

FIG. 9 illustrates an example of an item field 216 to be displayed after the session button 224 is pressed. When the session button 224 is pressed, the selection item display section 146 displays the item field 216 including options including an item for inviting a friend to a game session of a game which is activated and an item for inviting a friend to a game session of a game which is not yet activated. In a case in which the user A invites the user B to a session of a game which is currently being played by the user A, the user A selects the item "INVITE TO GAME SESSION." Alternatively, in a case in which the user A invites the user B to a session of another game, the user A selects the item "ACTIVATE GAME FIRST, AND INVITE TO GAME SESSION." In this manner, in the information processing device 10 of the embodiment, not individual games, but the system software manages an invitation to a game session. Accordingly, in any case in which the user A invites a friend to any kind of game, it is possible to invite the friend through the user interface in common to the games.

Figure 10:
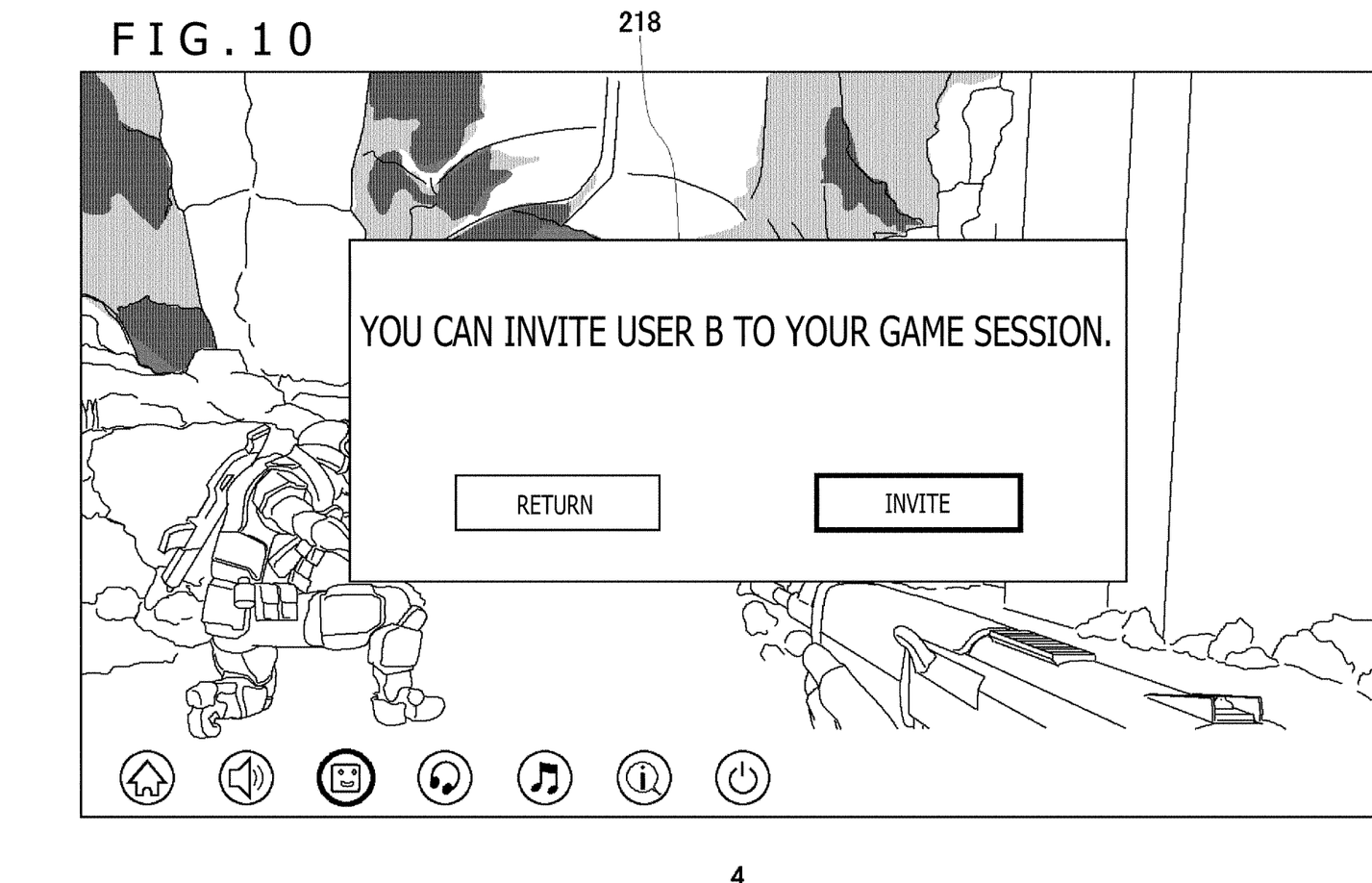
FIG. 10 is a diagram illustrating an example of an invitation window.

FIG. 10 illustrates an example of an invitation window 218 regarding the user B. When the item "INVITE TO GAME SESSION" is selected in the item field 216 illustrated in FIG. 9, the system image display section 130 displays the invitation window 218. When the user A selects and operates the item "INVITE," the session management section 116 transmits an invitation message to the user B through the management server 5. In a case in which a game session is already present, the session management section 116 invites the user B to the existing game session; whereas if there is no game session, the session management section 116 creates a new game session and then invites the user B thereto.

The present disclosure has been described above on the basis of the embodiment thereof. The foregoing embodiment is illustrative, and it is to be understood by those skilled in the art that combinations of components and processes thereof can be modified in various ways, and that these modification examples also fall within the scope of the present disclosure. In the embodiment, a game is provided as content; however, content may include a moving image other than the game.

INDUSTRIAL APPLICABILITY

The present disclosure is applicable to a technical field in which a plurality of images are overlapped on one another.

REFERENCE SIGNS LIST

1: Information processing system
10: Information processing device
100: Processing section
102: Communication section
110: Operation reception section
112: Content image display section
114: Acquisition section
116: Session management section
118: Content execution section
130: System image display section
140: Menu display section
142: Friend information display section
144: Button display section
146: Selection item display section

The invention claimed is:

1. An information processing device, comprising:
a processor; and
a memory storing computer executable instructions, wherein the processor is configured to execute the computer executable instructions to:
execute a game play session including receiving an input from an input device of a user and controlling a display to display a content image adjusted according to the input; and
during execution of the game play session:
receive a first input from the input device;
in response to reception of the first input, overlap a system image on the content image to generate an overlapped image;
control the display to display the overlapped image, wherein the overlapped image includes a session button for inviting a specific user to join the game play session;
in response a second input, from the input device, to select the session button, transmit an invitation to a device of the specific user to join the game play session; and
receive notification that the specific user has accepted the invitation, wherein the execution of the game play session further includes the specific user having joined the game play session which further adjusts the content image displayed during the game play session.

2. The information processing device according to claim 1, wherein the overlapped image further includes a button for inviting the specific user to a game session of a game that is not yet activated.

3. The information processing device according to claim 1, wherein the overlapped image further includes a chat button for inviting the specific user to join a chat session.

4. The information processing device according to claim 3, wherein the chat button is a text chat button for inviting the specific user to join a text chat session.

5. The information processing device according to claim 3, wherein the chat button is a voice chat button for inviting the specific user to join a voice chat session.

6. The information processing device according to claim 3, wherein the chat button is a video chat button for inviting the specific user to join a video chat session.

7. The information processing device according to claim 1, wherein the processor is further configured to execute the computer executable instructions to:
control the display to display information regarding the specific user on a same screen as the overlapped image.

8. The information processing device according to claim 1, wherein
the system image further includes a window including a plurality of users, and
the processor is further configured to execute the computer executable instructions to:
receive a selection, from the input device, of the specific user from the plurality of users; and
in response to the selection, transmit the invitation to the device of the specific user.

9. The information processing device according to claim 8, wherein the window includes a list of the plurality of users.

10. The information processing device according to claim 8, wherein the window indicates an activity status of each user of the plurality of users.

11. The information processing device according to claim 8, wherein the window indicates which game is being played by each user of the plurality of users.

12. An image displaying method, comprising:
executing, by a processor of an information processing device, a game play session including receiving an input from an input device of a user and displaying a content image adjusted according to the input; and
during execution of the game play session:
receiving a first input from the input device;
in response to reception of the first input, overlapping, by the processor, a system image on the content image to generate an overlapped image;
displaying the overlapped image, wherein the overlapped image includes a session button for inviting a specific user to join the game play session;
in response a second input, from the input device, to select the session button, transmitting an invitation to a device of the specific user to join the game play session; and
receiving notification that the specific user has accepted the invitation, wherein the execution of the game play session further includes the specific user having joined the game play session which further adjusts the content image displayed during the game play session.

13. The information processing method according to claim 12, wherein
the system image further includes a window including a plurality of users, and
the information processing method further includes:
receiving a selection, from the input device, of the specific user from the plurality of users; and
in response to the selection, transmitting the invitation to the device of the specific user.

14. The information processing method according to claim 13, wherein the window includes a list of the plurality of users.

15. The information processing method according to claim 13, wherein the window indicates an activity status of each user of the plurality of users.

16. The information processing method according to claim 13, wherein the window indicates which game is being played by each user of the plurality of users.

17. The information processing method according to claim 12, wherein the overlapped image further includes a text chat button for inviting the specific user to join a text chat session.

18. The information processing method according to claim 12, wherein the overlapped image further includes a voice chat button for inviting the specific user to join a voice chat session.

19. The information processing method according to claim 12, wherein the overlapped image further includes a video chat button for inviting the specific user to join a video chat session.

20. A non-transitory computer readable medium storing computer executable instructions which, when executed by a processor, cause the processor to execute a process comprising:
executing a game play session including receiving an input from an input device of a user and displaying a content image adjusted according to the input; and
during execution of the game play session:
receiving a first input from the input device;
in response to reception of the first input, overlapping a system image on the content image to generate an overlapped image;
displaying the overlapped image, wherein the overlapped image includes a session button for inviting a specific user to join the game play session;
in response a second input, from the input device, to select the session button, transmitting an invitation to a device of the specific user to join the game play session; and
receiving notification that the specific user has accepted the invitation, wherein the execution of the game play session further includes the specific user having joined the game play session which further adjusts the content image displayed during the game play session.

* * * * *